UNITED STATES PATENT OFFICE.

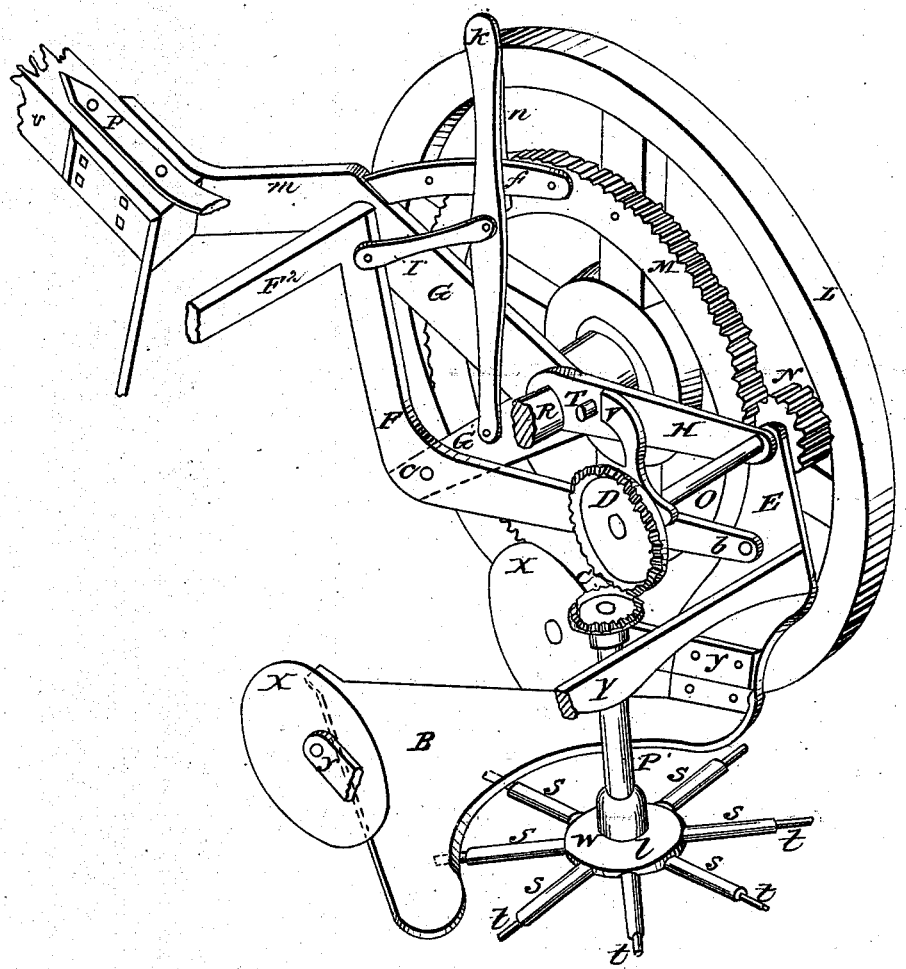

CORNELIUS VAN DERZEE AND BENJAMIN REAMER, OF ALBANY, NEW YORK.

IMPROVEMENT IN POTATO-DIGGERS.

Specification forming part of Letters Patent No. 103,258, dated May 17, 1870.

*To all whom it may concern:*

Be it known that we, CORNELIUS VAN DERZEE and BENJAMIN REAMER, of Albany, in the county of Albany and State of New York, have invented certain Improvements in Potato-Diggers, of which the following is a specification.

The principal object of our invention relates to the construction of a rotating separator having radial arms covered with india-rubber or any equivalent thereof, so that the radial arms will not cut the potatoes which are presented to them by the share or digger.

Our invention is designed mainly as an improvement to the potato-digger for which Letters Patent were granted to us jointly under date of July 20, 1869; yet these improvements may be applied to other machines used for the same purpose.

Figure 1 is a perspective view of one-half of a machine embodying our invention. The two opposite sides are similarly constructed, excepting that one side only has driving-gears M, N, D, and C and an operating-lever, K, as shown in the accompanying drawing.

L is one of the driving-wheels of the machine.

R is the axle of the machine, upon which the various parts of the machine are supported.

G is the side of the frame of the machine, made of wood or iron, or of any other suitable material. The inner end of the side G is perforated, so as to allow the axle R to revolve freely within it; or it may, if desired, be keyed to or otherwise fastened to the axle. The front end, $m$, of the frame connects the side pieces, G, to the pole $v$, as shown in the accompanying drawing. Side piece, G, has a short arm, $G^2$, projecting downward, and at an acute angle with it, as shown in Fig. 1, for the purpose of supporting bent lever F by its fulcra $c$, also the lower end of operating-lever K, as shown in the accompanying drawing.

H is a radial link, one end of which works freely upon axle R, and the other is connected to bracket-shaped or back link, E, by counter-shaft O, as shown in Fig. 1.

F is a bent lever, supported on short arm $G^2$ of side piece, G, as shown at $c$ in the accompanying drawing. The rear end of bent lever F is connected to back link, E, at a point, $b$, below counter-shaft O, so as to produce a parallel motion of link H and back half or bent lever F. The front end of bent lever F is connected by link I to operating-lever K.

$f$ is a quadrant secured to the side G, and has stop-holes or cogs or other suitable devices for retaining the operating-lever K in any desired position.

$n$ is a spring secured to lever K, to keep it against quadrant $f$, so as to press the stop-pin on lever K into the holes in quadrant $f$.

P is the lower portion of the support for the driver's seat.

V is a support for end of counter-shaft O.

T is a connecting rod or brace between links H.

Y is a brace at the back of the machine, firmly connecting together the back links, E, and also forming a support for the upright shaft P, as shown in Fig. 1.

B is a flat share or digger, which is attached to and supported by the back links, E.

W is a rotating separator secured to the lower end of shaft P, and revolves close behind share B. The back part of share B is cut out semicircularly, so as to allow the arms of wheel W to pass in close proximity to its edge, as shown in Fig. 1. Wheel W is constructed with arms $t$, secured to a hub, $z$. Said arms $t$ may be curved or straight, and set at an angle with the hub, so as to be tangent to the same, or set in a radial direction, as shown in the accompanying drawing, which last position we prefer, as being easiest of construction and best in operation. The arms $t$ or separator W are covered with india-rubber tubing, $s$, or other equivalent elastic material. The elastic covering $s$ extends from the hub $z$ of the wheel W nearly to the circular edge of the back part of share B. The arms $t$ may extend a little beyond the elastic covering $s$, so as to pass under the back edge of share B, as shown in the accompanying drawing.

X is a circular cutter, one of which is placed at each side of share B, and in about the relative position to it, as shown in Fig. 1. Said circular cutter X is supported by an arm, $y$, which is securely fastened to back link, E.

It will be seen from the above description that the share B, the wheel W, the vine-cutter X, and the operating mechanism of the machine may be raised or lowered at pleasure by means of lever K. As the potatoes are dug up or unearthed by the share B they are carried up toward the revolving arms of wheel W by the forward motion of the machine, when, if the arms of wheel W were constructed entirely of metal or wood or of other hard and unyielding substance, many of the potatoes would be ruined by being cut to pieces or badly bruised by the arms of the wheels, whereas by our improved mode of constructing the arms of wheel W all such difficulties and losses will be avoided. Without cutters X the vines will become entangled with the machine and prevent its easy operation, retarding its progress, and thus causing much loss of time, all of which difficulties are obviated by the employment of cutters X, as above shown and described.

We claim as our invention—

1. The wheel W, constructed with elastic covered arms, substantially as and for the purpose herein set forth.

2. The combination of circular cutters X, wheel W, and share B, with lever L, frame G, links H and E, and driving-gear M, N, D, and C, substantially as and for the purpose hereinbefore shown and described.

CORNELIUS VAN DERZEE.
   BENJAMIN REAMER.

Witnesses:
 WILLIAM D. STREVELL,
 N. T. SMITH.